Aug. 25, 1970  P. E. SCHUBERT  3,525,906
ELECTRIC POWER DISTRIBUTION APPARATUS
Filed Nov. 22, 1968  2 Sheets-Sheet 2

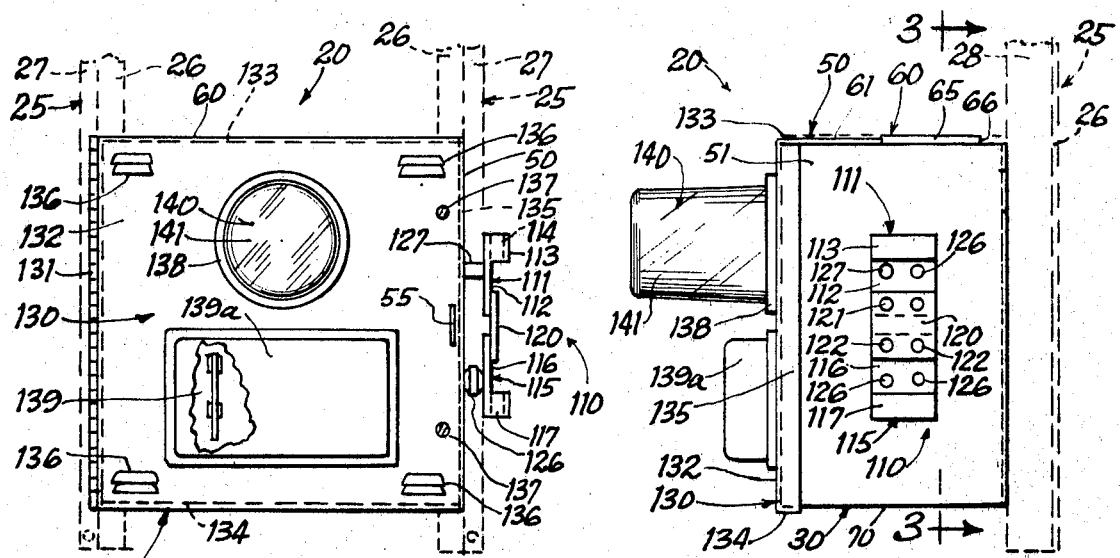
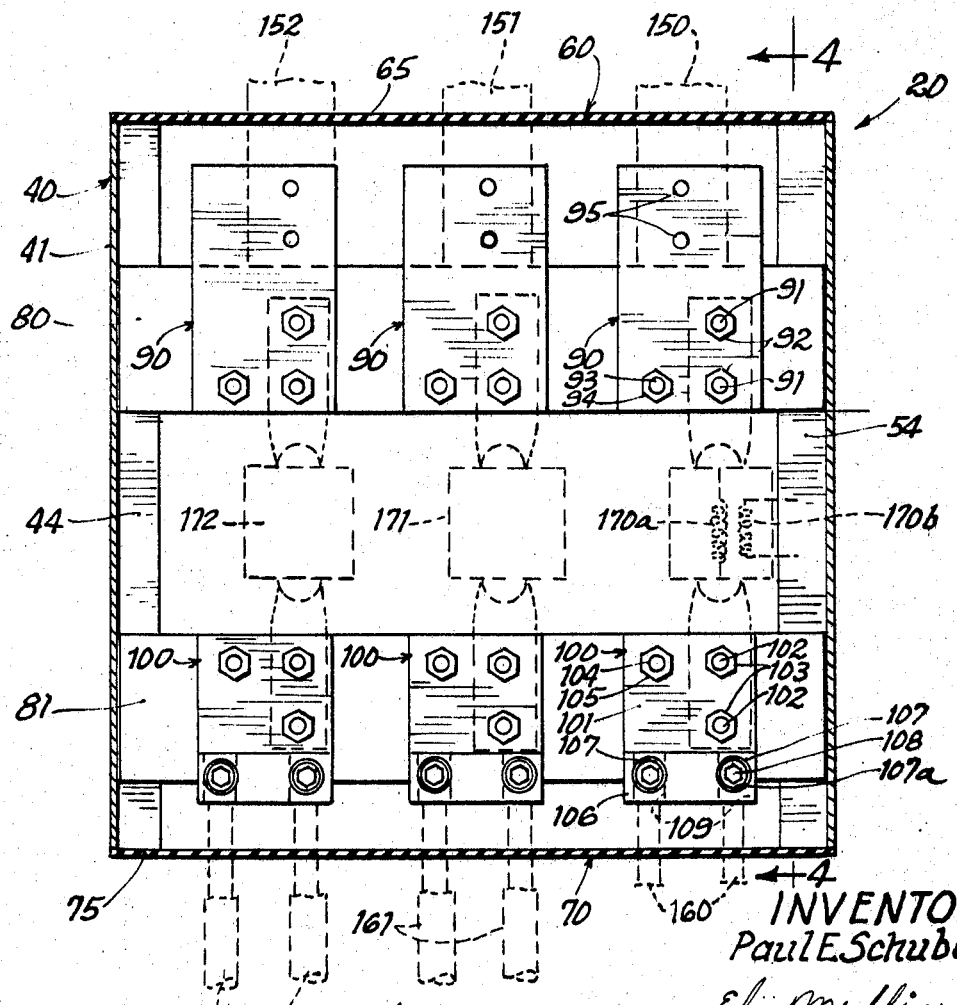

INVENTOR
Paul E. Schubert
Eli Mullin
Atty

United States Patent Office 3,525,906
Patented Aug. 25, 1970

3,525,906
ELECTRIC POWER DISTRIBUTION APPARATUS
Paul E. Schubert, Chicago, Ill., assignor to Cregier Electrical Mfg. Co., Chicago, Ill., a corporation of Illinois
Filed Nov. 22, 1968, Ser. No. 778,045
Int. Cl. H02b 9/00
U.S. Cl. 317—108   12 Claims

ABSTRACT OF THE DISCLOSURE

An electric power distribution apparatus comprising a cabinet defined by four side walls, at least two input terminals mounted in the cabinet to be coupled to an electric power source, at least two output terminals mounted in the cabinet to be coupled to a load, the primary windings of current meter transformers being respectively coupled between the input terminals and output terminals, a door hingedly mounted on the forward end of one of the walls, a receptacle carried by the door for mounting a kilowatt-hour meter, and a plurality of test switches mounted on the door interconnecting the receptacle and the secondaries of the current transformers. The cabinet and the door may have a square cross section to permit selection of the orientation of the cabinet with respect to the door. A neutral assembly may be mounted on one of the walls of the cabinet and used to couple a neutral conductor in the electric power source to the load.

BACKGROUND OF THE INVENTION

This invention relates to a prewired electric power distribution apparatus for use in apartment buildings, factory operations, and the like.

Prior electric power distribution systems included one cabinet within which was mounted a kilowatt-hour meter and a set of testing switches for use in conjunction with the meter. The electric power was distributed into various load lines in a second cabinet spaced from the water cabinet. Current transformers for the meter were mounted in the power distribution cabinet, the meter switches electrically interconnecting the meter and the current transformers. By selective switch operation, a workman could readily determine from the meter the amount of power flowing into various load circuits.

However, the use of two separate cabinets has some undesirable aspects. First, it is necessary that the electric power supply, the loads, the distribution cabinet and the meter cabinet be interconnected at the site so as to provide a substantial amount of preliminary electrical installation work. It is well known that in a production program, various workmen such as electricians are scheduled to work and if such work is not promptly and readily accomplished, an entire production schedule may be disrupted. A more serious aspect of utilizing one cabinet for housing the meter and a second cabinet for performing the distribution functions, is that excessive and valuable space is consumed thereby.

Another problem with presently available electric power distribution units arises from the fact that the units have a fixed predetermined orientation. Accordingly, a special unit must be designed to accommodate each input-output conductor arrangement which unnecessarily increases the cost of the unit.

SUMMARY OF THE INVENTION

It is, therefore, an important object of this invention to provide an electric power distribution apparatus which will overcome all of the objections indicated hereinabove.

A primary object of this invention is to provide a prewired electric power distribution apparatus which is readily and inexpensively installed and serviced.

Another object of this invention is to provide an electric power distribution apparatus which takes up a minimum amount of space.

A further object of this invention is to provide an electric power distribution apparatus which may be installed at any time before or after the load circuit wiring is completed.

Still another object of this invention is to provide an electric power distribution apparatus wherein the kilowatt-hour meter, the meter testing gear and the structure for distributing the input electric power are all mounted in a single cabinet.

Yet another object of this invention is to provide an electric power distribution apparatus that operates as a module so as to be highly versatile and usable in a variety of environments.

Finally, an important object is to provide an electric power distribution apparatus of relatively simple, inexpensive construction, and representing highly desirable improvements over prior electric power distribution units.

In summary, there is provided an electric power distribution apparatus for coupling a load to an electric power source and for use with a kilowatt-hour meter and associated current meter transformers each having a high current primary and a low current secondary, the electric power distribution apparatus comprising a cabinet including four walls connected at adjacent edges to provide an enclosure having front and rear openings, at least two input terminals mounted in the cabinet and electrically insulated therefrom and coupled in use to the electric power source, at least two output terminals mounted in the cabinet and electrically insulated therefrom and coupled in use to the load, the primaries of each of the associated current meter transformers being coupled for use between input terminals and output terminals, a door hingedly mounted on the forward end of one of the walls and swingable between open and closed positions with respect to the front opening, a receptacle carried by the door for mounting the associated kilowatt-hour meter thereon and providing electrical connections thereto, and a plurality of meter test switches mounted on the door and electrically interconnected with the receptacle and in use electrically interconnected with the secondaries of the associated current transformers.

There will usually be provided a neutral assembly mounted on one of the walls of the cabinet for coupling the load to a grounded neutral conductor in the electric power source.

The cabinet and the door may have a square shaped cross section to permit orientating the cabinet in a variety of positions with respect to the door.

With the foregoing and other objects in view which will appear as the description proceeds, the invention consists of certain novel features of construction, arrangement and a combination of parts hereinafter more fully described, illustrated in the accompanying drawings, particularly pointed out in the appended claims, it being understood that various changes in the form, proportion, size and minor details of the structure may be made without departing from the spirit or sacrificing any of the advantages of the invention.

BRIEF DESCRIPTION OF THE DRAWINGS

For the purpose of facilitating an understanding of my invention, I have illustrated in the accompanying drawings preferred embodiments thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

FIG. 1 is a front elevational view of an electric power distribution apparatus embodying the principles of my invention;

FIG. 2 is a side elevational view of the distribution apparatus of FIG. 1;

FIG. 3 is an enlarged view in vertical cross section of the distribution apparatus of FIG. 2 taken along the lines 3—3 thereof;

DESCRIPTION OF THE PREFERRED EMBODIMENTS

Figure 4:
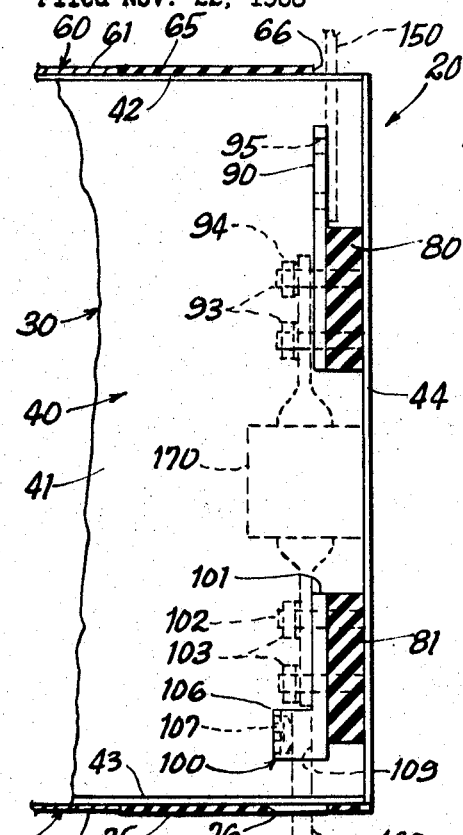
FIG. 4 is a fragmentary view in vertical section of the distribution apparatus of FIG. 3 taken along the lines 4—4 thereof.

Referring first to FIGS. 1 to 5 of the drawings, reference numeral 20 indicates generally an electric power distribution apparatus mounted on a pair of longitudinally extending and laterally spaced-apart Z-shaped rails 25, each of the rails 25 including a pair of generally parallel attachment flanges 26 and 27 joined by a bight flange 28. The attachment flange 26 of each of the rails 25 is joined to an upstanding wall or the like at the location where the electric power distribution apparatus 20 is to be mounted. The distribution apparatus 20 is mounted to the attachment flanges 27.

The electric power distribution apparatus 20 comprises a cabinet including four side walls 40, 50, 60 and 70 connected at adjacent edges to provide an enclosure having front and rear openings. More specifically, the side wall 40 includes a body portion 41, a top flange 42 formed at the top of the body portion 41 and depending therefrom, a bottom flange 43 formed at the bottom of the body portion 41 and depending therefrom, and a rear flange 44 formed at the rear of the body portion 41 and depending therefrom. The side wall 50 includes a body portion 51, a top flange 52 formed at the top of the body portion 51 and depending therefrom, a bottom flange 53 formed at the bottom of the body portion 51 and depending therefrom, and a rear flange 54 formed at the rear of the body portion 51 and depending therefrom. Formed adjacent to the front edge of the body portion 51 approximately centrally thereof is a protruding finger 55.

The top wall 60 is formed of a metal panel 61 having a width approximately half the width of the side walls 40 and 50. The metal panel 61 is joined adjacent to one end thereof to the top flange 42, and joined adjacent to the other end thereof to the top flange 52. The top wall 60 also includes a fiber barrier 65 also about half the width of the side walls 40 and 50, the fiber barrier 65 having a longitudinally extending slot 66 adjacent to the rear thereof for use as will be explained hereafter. The fiber barrier 65 is secured adjacent to one end thereof to the top flange 42, and secured adjacent to the other end thereof to the top flange 52.

The bottom wall 70 is formed of a metal panel 71 having a width approximately half the width of the side walls 40 and 50. The metal panel 71 is joined adjacent to one end thereof to the bottom flange 43, and joined adjacent to the other end thereof to the bottom flange 53. The bottom wall 70 includes a fiber barrier 75 also about half the width of the side walls 40 and 50, the fiber barrier 75 having a longitudinally extending slot 76 at the rear thereof for use as will be explained hereafter. The fiber barrier 75 is secured adjacent to one end thereof to the bottom flange 43, and secured adjacent to the other end thereof to the bottom flange 53.

The electric power distribution apparatus 20 further includes a pair of insulator panels 80 and 81 which may be constructed for example of ebony asbestos. The insulator panel 80 is disposed longitudinally and spaced below the top wall 60, the panel 80 being secured adjacent to one end thereof to the rear flange 44, and adjacent to the other end thereof to the rear flange 54. The insulator panel 81 is also disposed longitudinally and spaced below the insulator panel 80, the insulator panel 81 being secured adjacent to one end thereof to the rear flange 44, and adjacent to the other end thereof to the rear flange 54.

The distribution apparatus 20 further includes a set of three input terminals 90, the construction of which are substantially identical. The input terminals 90 are in the form of rectangular plates and are disposed in spaced-apart relationship on the insulator panel 80 and are secured thereto by means of bolts 91 and nuts 92 and by means of bolts 93 and nuts 94. Each input terminal 90 has a pair of apertures 95 therein.

The electric power distribution apparatus 20 further includes a set of three output terminals 100 substantially identical to one another. Each output terminal 100 includes a plate portion 101 and a lug portion 106 integral therewith, the lug portion 106 having a thickness substantially greater than the thickness of the plate portion. In the preferred form of the invention, the lug portion 106 is integral with the plate portion 101, and are together formed as a copper extrusion. Extending transversely in the lug portion 106 are a pair of laterally spaced-apart threaded slugs 107 respectively threadedly engaging in threaded openings 107a. Formed in each of the threaded slugs 107 is a hex opening 108 adapted to receive a similarly shaped tool for use in rotating the slug 107 in the opening 107a. Respectively communicating with the threaded openings 107a are a pair of conductor-receiving openings 109 extending through the lug portion 106 and each having an axis directed generally normal to the axis of the respective openings 107a. Although two conductor-receiving openings 109 are shown, it is to be understood that any desired number of such openings together with associated slugs could be provided, depending on the number of load lines required. The three output terminals 100 are disposed on the insulator panel 81 in a laterally spaced-apart relationship and secured thereto by means of bolts 102 and 104 extending through the plate portions 101 and respectively engaging nuts 103 and 105.

The electric power distribution apparatus 20 also includes a neutral assembly 110 including a neutral input terminal 111 having a construction similar to any of the output terminals 100 previously described. More specifically, the input terminal 111 includes a plate portion 112 and a lug portion 113 integral therewith and formed, in the preferred embodiment, of a copper extrusion. There is provided a conductor-receiving opening 114 in the lug portion 113 and a threaded slug (not shown) cooperating therewith. The neutral assembly 110 also includes an output terminal 115 and is in the form of a copper extrusion having a plate portion 116 and a lug portion 117 integral therewith. The lug portion 117 has conductor-receiving openings (not shown) and threaded slugs (not shown) similar to those explained with respect to the output terminal 100. The neutral assembly 110 also includes a link plate 120 joined to the plate portions 112 and 116 by means of fasteners 121 and 122 electrically to connect these portions together. There is provided a set of three insulators 126 joined to the neutral assembly 110 and to the wall 50 electrically to insulate the neutral assembly 110 therefrom. There may be provided a ground post 127 electrically to connect the neutral assembly 110 to the wall 50 so that both the neutral assembly 110 and the cabinet 30 are at ground potential.

Figure 5:
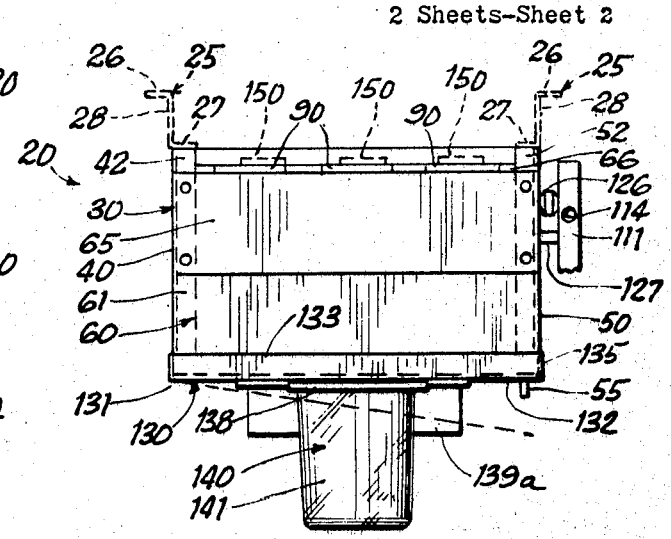
FIG. 5 is a top plan view of the distribution apparatus.

The electric power distribution apparatus 20 also has a front door 130 having a substantially square outline and having a hinge 131 along one edge thereof, the left-hand edge as viewed in FIGS. 1 and 5. The front door 130 includes a body portion 132, a top flange 133 formed at the top of the front door 130 and depending therefrom, a bottom flange 134 formed at the bottom of the body portion 132 and depending therefrom, and a side flange 135 formed on the side of the body portion 132 opposite the hinge 131. Formed in the body portion 132 adjacent to the four corners thereof are vents 136 to accommodate air flow into the cabinet 30. There are also provided screws 137 in the body portion 132 disposed adjacent to the side flange 135 thereof, the screws 137 engaging keeper structure (not shown) in the cabinet 30 to hold the door 130 in the closed position thereof. When the door 130 is closed, the top flange 133 overlies the top wall 60, the bottom flange 134 lies beneath the bottom wall 70, and the side flange 135 lies against the side wall 50. A slot in the door 130 near the side flange 135 receives the finger 55 therethrough. The door 130 also carries a meter receptacle 138 mounted in the upper portion thereof. Mounted on the lower portion of the front door 130 is a set of test switches 139 protected by a cover 139a.

In manufacturing the electric power distribution apparatus 20, the walls 40 through 70 are assembled to form the cabinet 30, the terminals 90 and 100 and the neutral assembly 110 are mounted on the cabinet 30, and the front door 130 is mounted by means of the hinge 131 to one of the walls 40, 50, 60 or 70, the selection of which will be explained in detail hereinafter. The test switches 139 located under the cover 139a are electrically connected to the meter receptacle 138. The prewired electric power distribution apparatus 20 is now ready to be mounted on the rails 25 along with other system components such as power switches. On the other hand, the prewired electric power distribution apparatus may be taken as such to the site of its installation.

The electric power source with which the embodiment of FIGS. 1 to 5 may be used can be a single or three-phase system. As well known in the art, a three-phase system includes three ungrounded lines and a ground. After the electric power distribution apparatus 20 is mounted on an upstanding support, a set of input bus bars 150, 151 and 152 (three being required for three-phase energization) connected to the three "hot" lines from the electric power source are passed through the slot 66 in the top wall 60 and are respectively electrically connected to the three input terminals 90 by passing fasteners (not shown) through the apertures 95. The bus bars 150, 151 and 152 are insulated from the cabinet 30, the fiber barrier 65 minimizing the chance of an inadvertent short between the bus bars 150, 151 and 152 and the cabinet 30. The line from the electric power source is brought to the neutral assembly 110 and is threaded into the input terminal 111 and secured thereto.

There are provided three pairs of output conductors 160, 161 and 162 that pass through the slot 76 in the bottom wall 70 and into the cabinet 30, the fiber barrier 65 providing insulation between the conductors 160, 161 and 162 and the cabinet 30. The conductors 160 are respectively threaded into the conductor-receiving openings 109 in a lug portion 106 in one of output terminals 100, and the slugs 107 are rotated to be drawn against the conductors 160, securely to retain them in the one output terminal 100 and to provide electrical connection thereto. Similarly, the conductors 161 are threaded into the conductor-receiving openings 109 in the second of the output terminals 100 and the output conductors 162 are threaded into the conductor-receiving openings in the third of the output terminals 100. It is to be understood that if one load conductor for each phase is required, then each output terminal 100 would have one conductor-receiving opening 109 or only one of the two shown would be used. Also, if three load conductors are required, then each output terminal 100 would have three conductor-receiving openings 109. The slugs 107 are tightened to hold the conductors in their respective output terminals 100 and to make electrical connection thereto. An output conductor (not shown) is coupled from the output terminal 115 of the neutral assembly 110 to the load. The output conductors 160, 161 and 162, if not previously wired to the load, are now connected thereto. Similarly, if the input bus bars 150, 151 and 152 were not previously connected to the electric power source, they are now connected thereto.

An electrician from the power company will then mount a standard integrating meter 140 into the meter receptacle 138. The meter 140 is of a standard integrating type and includes a face 141 permitting the meter man to read the same.

Associated with the meter 140 is a set of current transformers 170, 171 and 172 shown in phantom in FIG. 3. The current transformers are similar so that only current transformer 170 need be described. The current transformer 170 is schematically shown to include a primary winding 170a which is connected to one of input terminals 90 by means of the bolts 91 and the nuts 92. The other end of the primary winding 170a is connected to the associated one of the output terminals 100 by means of the bolts 102 and the nuts 103, thereby to provide electrical continuity between one of the input terminals 90 and the associated one of the output terminals 100. Similarly, the primary winding of the current transformer 171 is connected between a second of the input terminals 90 and the associated one of the output terminals 100. Also, the primary winding of the current transformer 172 is connected between a third of the input terminals 90 and the associated one of the output terminals 100 to provide electrical continuity therebetween. If it is desired to remove any of the current transformers 170, 171 or 172 without interrupting service, a strap may be connected between an associated pair of input and output terminals by way of the bolts 93 and 104 and the nuts 94 and 105.

The electrician from the power company then connects the wires leading from the test switches 139 to the secondary windings of the current transformers 170, 171 and 172 according to power company requirements. By selectively operating the test switches 139, the electrician may read on the meter 140 the current flow in any of the three load paths. After he has made the determination that the meter 140 and the electric power distribution apparatus 20 are properly functioning, he will place the cover 139a in position and seal it to the door 130 to prevent operation of the switches 139 by someone other than the power company. In addition, he will install a standard seal on the finger 55 that extends through the mating slot in the door 130, thus to prevent opening of the door 130 by someone other than an authorized representative of the power company.

It may be appreciated that the electric power distribution apparatus 20 just described is completely assembled at the factory so that when it is brought to the site of installation, it need merely be mounted on a wall, have the input and output connected thereto, have the kilowatt-hour meter and the current transformers mounted, and have the wires leading from the meter test switches connected. At the factory, the meter receptacle 138 and the test switches 139 have been provided as part of the electric power distribution apparatus 20, and the electrical connections therebetween have been completed. The fact that the meter 140 on the test switches 139 are mounted as part of the electric power distribution apparatus 20, and the fact that the neutral assembly 110 is mounted on the side wall of the cabinet minimizes the space consumed by the distribution apparatus 20.

Figures 6, 7:
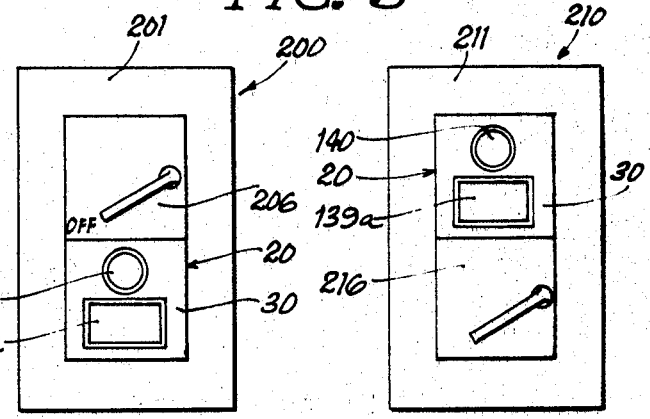
FIG. 6 is a schematic and diagrammatic view of the electric power distribution apparatus used in conjunction with a main switch having a particular orientation with respect to the distribution apparatus.
FIG. 7 is a schematic and diagrammatic view of the electric power distribution apparatus used in conjunction with a main switch having a different orientation with respect to the distribution apparatus.

Referring now to FIG. 6 there is shown a system 200 including a frame 201. Mounted on the frame 201 is an electric power distribution apparatus 20 having the construction shown and described in FIGS. 1 to 5. The frame may include a pair of Z-shaped rails similar to the rails 25 of FIGS. 1 to 5. Mounted on the frame 201 adjacent to the electric power distribution apparatus 20 is a main switch 206. The lines from the electric power source are connected by suitable means to the input of the main switch 206, the output of the main switch 206 being coupled to the input terminals 90 of the electric power distribution apparatus 20 by way of the input bus bars 150, 151 and 152. It should be noted that because the switch 206 is disposed above the distribution apparatus 20, the axes of the input terminals 90 are directed upwardly to facilitate connection thereto. The output terminals 100 are connected via the conductors 160, 161 and 162 to the load. By opening the switch 206, power to the distribution apparatus 20 and to the load may be interrupted.

Referring now to FIG. 7, there is shown a system 210 similar to the system 200 of FIG. 6. More particularly, the system 210 includes a frame 211 on which is mounted an electric power distribution apparatus 20 having the construction shown and described in FIGS. 1 to 5. Mounted on the frame 201 adjacent to the electric power distribution apparatus 20 and disposed therebelow is a main switch 216. The ungrounded lines in the electric power source are connected by suitable means to the input of the main switch 216, the output of the main switch 216 being coupled to the input terminals of the electric power distribution apparatus 20 by way of the bus bars 150, 151 and 152. The output terminals 100 are connected to the load via conductors 160, 161 and 162. By operating the switch 216, the power to the distribution apparatus 20 and to the load may be interrupted.

It should be noted that whereas the main switch 206 was disposed above the distribution apparatus 20 in FIG. 6, the arrangement is reversed in FIG. 7 and the main switch 216 is disposed below the distribution apparatus 20. To accommodate the placement of the main switch 206 in the system 200 of FIG. 6, the axes of the input terminals 90 are directed upwardly. In the system 210 of FIG. 7, the cabinet 30 is rotated such that the axes of the input terminals 90 are directed downwardly so as to accommodate the location of the switch 216, i.e., below the distribution apparatus 20. Because the cabinet 30 has a square outline and because the door 130 also has a square outline, the door 130 may then be connected to any of the walls 40, 50, 60 or 70. Accordingly, once the desired orientation of the cabinet 30 is selected, the door 130 is hingedly connected to the side wall that permits an individual standing in front of the system 210 to view the meter 140 and to operate the meter switches 139.

Figure 8:
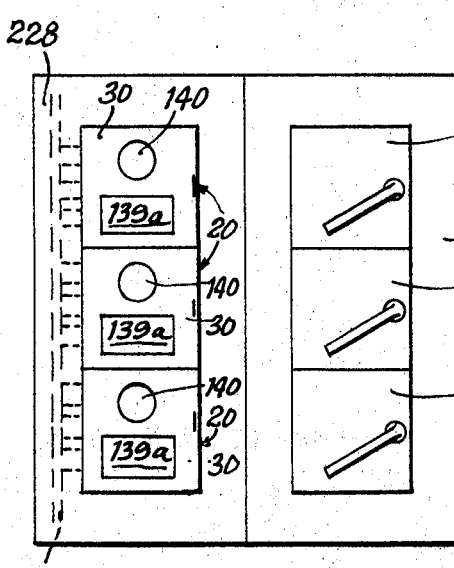
FIG. 8 is a schematic and diagrammatic view of several electric power distribution apparatuses used in conjunction with several switches.

Referring now to FIG. 8, there is shown a system 220 including three electric power distribution apparatuses 20 arranged in a vertical column and mounted on a frame 221 adjacent to the left side thereof. Also mounted on the frame 221 adjacent to the right side thereof is a set of three switches 224, 225 and 226 arranged in a vertical column and respectively disposed adjacent to individual ones of distribution apparatuses 20. Suitable electric connections are made between the switches 224, 225 and 226 and the distribution apparatuses 20.

In this embodiment, the switches 224, 225 and 226 are in a side-by-side relationship with the distribution apparatuses 20, whereby the orientation of the input conductors 150, 151 and 152 in each of the apparatuses 20 is different than the orientation of the input conductors 150, 151 and 152 in the apparatus 20 in either FIG. 6 or 7. Again, because the outline of the cabinet 30 in each of the apparatuses 20 is square as is the door 130, each apparatus 20 may be oriented so that its input terminals 100 are disposed horizontally, i.e. toward the right as viewed in FIG. 8 in order individually to connect to the outputs of the switches 224, 225 and 226. The output conductors 90 in each distribution apparatus 20 are coupled to output conductors disposed in the channel 228 located o the left side, as viewed in FIG. 8, of the frame 221. When the desired orientation on the cabinet 30 in each of the apparatuses 20 is selected, the associated door 130 is hingedly connected to the side wall that permits an individual standing in front of the system 220 to view each of the meters 140 and to operate each set of meter switches 139.

In all instances, it is understood that connection between power input terminals for each apparatus 20 and voltage windings of a meter will be provided. Thus a meter can register the load power in conventional manner.

It may be seen therefore that the electric power distribution apparatus 20 is a highly versatile unit as the cabinet 30 may be oriented such that the input conductors are oriented either upwardly or downwardly or horizontally yet maintaining the meter 140 and the meter switches 139 in readily readable position.

It is believed that my invention, its mode of construction and assembly, and many of its advantages should be readily understood from the foregoing without further description, and it should also be manifest that while preferred embodiments of the invention have been shown and described for illustrative purposes, the structural details are nevertheless capable of wide variation within the purview of my invention as defined in the appended claims.

What I claim and desire to secure by Letters Patent of the United States is:

1. Electric power distribution apparatus for coupling a load to an electric power source and for use with a kilowatt-hour meter and its associated current transformers, each having a high current primary and a low current secondary, said electric power distribution apparatus comprising:

a cabinet including four walls connected at adjacent edges to provide an enclosure having front and rear openings;

two input terminals mounted in said cabinet and electically insulated therefrom and coupled in use to the electric power source;

two output terminals mounted in said cabinet and electrically insulated therefrom and coupled in use to the load, the primary of one of the associated current transformers being coupled in use between one of said input terminals and one of said output terminals, the primary of the other of the associated current transformers being coupled in use between the other of said input terminals and the other of said output terminals;

a door hingedly mounted on the forward end of one of said walls and swingable between open and closed positions with respect to said front opening;

a receptacle carried by said door for mounting the associated kilowatt-hour meter thereon and providing electrical connections thereto; and a plurality of meter test switches mounted on said door and electrically interconnected with said receptacle and in use electrically interconnected with the secondaries of the associated current transformers.

2. An electric power distribution apparatus as defined in claim 1, wherein:

two opposing ones of said walls are each formed partly of a metal panel and partly of an insulating barrier, one of said insulating barriers having a slot therein through which conductors from the electric power source can pass to said input terminals, the other of said insulating barriers having a slot therein through which conductors from said output terminals can pass to the load.

3. An electric power distribution apparatus as defined in claim 1 which further includes:
a third input terminal mounted in said cabinet and coupled in use to the electric power source,
a third output terminal mounted in said cabinet and coupled in use to the load, the primary of an associated third current transformer being coupled in use between said third input terminal and said third output terminal.

4. An electric power distribution apparatus as defined in claim 1 which further includes:
an insulator mounted on the rear ends of two opposing ones of said walls, said input terminals being mounted on said insulator in a spaced-apart relationship.

5. An electric power distribution apparatus as defined in claim 1 which further includes:
an insulator mounted on the rear ends of two opposing ones of said side walls, each of said output terminals being an integral copper extrusion having a plate portion secured to said insulator and a lug portion for connection in use to the load.

6. An electric power distribution apparatus as defined in claim 1, wherein: each of said output terminals include:
an integral lug having at least two conductor-receiving openings and at least two fastener-receiving threaded openings respectively communicating with said conductor-receiving openings, said conductor-receiving openings respectively being for receiving conductors connected to various parts of the load,
two threaded slugs respectively threadably engaging said fastener-receiving openings and drawn in use against the last-mentioned conductors to hold them in said lug.

7. Electric power distribution apparatus for coupling a load to an electric power source including a pair of ungrounded line conductors and a grounded neutral conductor and for use with a kilowatt-hour meter and two associated current transformers each having a high current primary and a low current secondary, said electric power distribution apparatus comprising:
a cabinet including four walls connected at adjacent edges to provide an enclosure having front and rear openings;
two input terminals mounted in said cabinet and electrically insulated therefrom and coupled in use respectively to the ungrounded line conductors;
two output terminals mounted in said cabinet and electrically insulated therefrom and coupled in use to the laod, the primary of one of the associated current transformers being coupled in use between one of said input terminals and one of said output terminals, the primary of the other of the associated current transformers being coupled in use between the other of said input terminals and the other of said output terminals;
a neutral assembly mounted on one of the walls of said cabinet for coupling the grounded neutral conductor to the load;
a door hingedly mounted on the forward end of one of said walls and swingable between open and closed positions with respect to said front opening;
a receptacle carried by said door for mounting the associated kilowatt-hour meter thereon and providing electrical connections thereto; and
a plurality of meter test switches mounted on said door and electrically interconnected with said receptacle and in use electrically interconnected with said neutral assembly and with the secondaries of said current transformers.

8. An electric power distribution apparatus as defined in claim 7, wherein:
said neutral assembly is mounted on the outside surface of said one wall of said cabinet.

9. An electric power distribution apparatus as defined in claim 7 which further includes:
a ground post electrically connecting said neutral assembly to said one wall, said one wall being formed of metal.

10. An electric power distribution apparatus as defined in claim 7, wherein said neutral assembly includes:
a neutral input terminal coupled in use to the grounded neutral conductor,
a neutral output terminal coupled in use to the load, and
a link electrically connecting said neutral input terminal to said neutral output terminal.

11. Electric power distribution apparatus for coupling a load to an electric power source and for use with a kilowatt-hour meter and two associated current transformers each having a high current primary and a low current secondary, said electric power distribution apparatus comprising:
a cabinet including four walls connected at adjacent edges to provide an enclosure of generally square cross section and having front and rear openings;
two input terminals mounted in said cabinet and electrically insulated therefrom and each having a longitudinal axis directed toward one of said walls and coupled in use to the electric power source, said cabinet being mountable on a support with the axes of said input terminals selectively directed generally upwardly or generally downwardly or generally horizontally;
two output terminals mounted in said cabinet and electrically insulated therefrom coupled in use to the load, the primary of one of the associated current transformers being coupled in use between one of said input terminals and one of said output terminals, the primary of the other of the associated current transformers being coupled in use between the other of said input terminals and the other of said output terminals;
a substantially square-shaped door hingedly mounted on any of the front edges of said walls and swingable between open and closed position with respect to said front opening;
a receptacle carried by said door for mounting the associated kilowatt-hour meter thereon and providing electrical connections thereto; and
a plurality of meter test switches mounted on said door and in use interconnecting said receptacle with the secondaries of the associated current transformers;
whereby an individual in front of said electric power distribution apparatus and in a normal upright position can view the meter and can operate said switches.

12. An electric power distribution apparatus as defined in claim 11, wherein:
said door is hingedly mounted to one of said walls that is upstanding when said cabinet is mounted on the associated support.

References Cited
UNITED STATES PATENTS 3,183,048   5/1965   Keller     317—107 X
3,458,768   7/1969   Schubert     317—108

LARAMIE E. ASKIN, Primary Examiner

G. P. TOLIN, Assistant Examiner

U.S. Cl. X.R.

307—150